United States Patent [19]

Nomura et al.

[11] Patent Number: 4,753,075
[45] Date of Patent: Jun. 28, 1988

[54] PORTLESS TYPE MASTER CYLINDER DEVICE WITH INTAKE VALVE AND FLOW RESISTING MEANS BETWEEN PRESSURE CHAMBER AND RESERVOIR CHAMBER

[75] Inventors: Yoshihisa Nomura; Shigeru Sakamoto, both of Toyota, Japan

[73] Assignee: Toyota Jidosha Kabushiki Kaisha, Japan

[21] Appl. No.: 918,974

[22] Filed: Oct. 15, 1986

[30] Foreign Application Priority Data

Oct. 18, 1985 [JP] Japan .................................. 60-232790
Feb. 3, 1986 [JP] Japan .................................. 61-21734

[51] Int. Cl.⁴ .............................................. B60T 11/16
[52] U.S. Cl. .............................................. 60/589; 91/31
[58] Field of Search ........................ 60/585, 588, 589; 91/31

[56] References Cited

U.S. PATENT DOCUMENTS 4,267,697  5/1981  Hodkinson ............................ 60/589
4,492,082  1/1985  Belart .................................... 60/589
4,550,567 11/1985  Schaefer ............................. 60/589 X

FOREIGN PATENT DOCUMENTS

56-135348 10/1981 Japan .

Primary Examiner—A. Michael Chambers
Assistant Examiner—John C. Fox
Attorney, Agent, or Firm—Parkhurst & Oliff

[57] ABSTRACT

In this portless type master cylinder device, a cylinder bore is formed in a body thereof, and a piston member is fitted in the cylinder bore and is slidably movable from an initial axial position therein and defines a pressure chamber on its one side and a reservoir chamber on its other side in cooperation with the cylinder bore. An intake valve communicates between the cylinder chamber and the reservoir chamber, and is opened when the piston member is in its initial axial position while it is closed when the piston member moves through more than a determinate relatively small axial distance from its initial axial position. Intermediately along the fluid flow path between the intake valve and the reservoir chamber, there is provided a means for presenting a relatively high flow resistance to flow of fluid in the direction from the intake valve to the reservoir chamber. Thereby, in the dynamic operational mode, the stroke of the piston member has a much reduced inactive initial stroke portion, as compared with other portless type master cylinder devices, and the operational feeling of the master cylinder device is greatly improved.

9 Claims, 5 Drawing Sheets

PORTLESS TYPE MASTER CYLINDER DEVICE WITH INTAKE VALVE AND FLOW RESISTING MEANS BETWEEN PRESSURE CHAMBER AND RESERVOIR CHAMBER

BACKGROUND OF THE INVENTION

The present invention relates to a master cylinder device for use, for example, in a braking system or a clutching system for an automotive vehicle, and more particularly relates to a portless type such master cylinder device which is improved with regard to its operational and feeling characteristics.

The present invention has been described in Japanese Patent Application Ser. No. 60-232790 (1985) and 61-021734 (1986), filed by an applicant the same as the entity assigned or owed duty of assignment of the present patent application; and the present patent application hereby incorporates into itself by reference the text of said Japanese Patent Application and the claims and the drawings thereof; a copy is appended to the present application.

Further, the present inventors wish hereby to attract the attention of the examining authorities to copending patent application Ser. No. 918,971, which may be considered to be material to the examination of the present patent application.

In, for example, Japanese Patent Laying Open Publication Ser. No. 56-135348 (1981), which is it not intended hereby to admit as prior art to the present patent application except to the extent in any case required by applicable law, there is disclosed a portless type master cylinder device, for example for a braking or clutching system for a vehicle such as an automobile, which has a body within which is formed a cylinder bore, with a piston member being fitted in the cylinder bore so as to be slidably movable from an initial axial position therein which said piston member is at when not impelled by the brake or clutch pedal of the vehicle to which this master cylinder device is fitted, a pressure chamber being defined by said piston member in cooperation with the cylinder bore on the one side of said piston member and a reservoir chamber being defined on the other side of said piston member, with a one direction type seal construction being provided for allowing the flow of fluid from said reservoir chamber to said pressure chamber but for preventing the flow of fluid from said pressure chamber to said reservoir chamber, and in which an intake valve communicates between the cylinder chamber and the reservoir chamber, this intake valve being opened when the piston member is in its initial axial position while said intake valve is closed when the piston member moves through more than a determinate relatively small axial distance from its said initial axial position. Thereby, when the brake or clutch pedal of the vehicle is not substantially depressed and accordingly the piston member is in its initial axial position, the intake valve allows brake or clutch fluid to be supplied freely from the reservoir chamber into the cylinder chamber, thus to replenish said cylinder chamber, and also back again, thus to allow excess pressure in said cylinder chamber to be vented to said reservoir chamber. However, when the brake or clutch pedal of the vehicle is progressively depressed, the piston member is progressively displaced from its said initial axial position so as to reduce the volume of said cylinder chamber, and initially said intake valve only slowly and progressively approaches the closed condition, to become completely closed only when said piston member has moved through said determinate relatively small but yet somewhat considerable axial distance from its said initial axial position. Thereafter, the brake or clutch fluid in said pressure chamber is squeezed, to be ejected therefrom towards the braking or clutching system of the vehicle in a per se conventional manner. Such a portless type master cylinder device dispenses with any port or ports in the side of the cylinder bore which are required to be traversed by the land or lands of the piston member during its stroke, substituting the action of the above described valve for the action of said port or ports, and accordingly the durability of the master cylinder device is enhanced.

However, this type of portless type master cylinder device is fraught with problems which will now be outlined. As described above, as the brake or clutch pedal of the vehicle is progressively depressed and the piston member is progressively displaced from its said initial axial position so as to reduce the volume of said cylinder chamber, since initially said intake valve only slowly and progressively approaches the closed condition until said piston member has moved through said determinate relatively small but yet somewhat considerable axial distance from its said initial axial position, thereby during this initial movement of the piston member no actuation of the braking or clutching system for the vehicle is performed, and instead brake or clutch fluid is expelled from the pressure chamber back into the reservoir chamber, which is quite inappropriate at this time. This occurs both when the brake or clutch pedal of the vehicle is depressed at relatively high speed, i.e. during so called dynamic operation, and when said brake or clutch pedal of the vehicle is depressed at relatively low speed, i.e. during so called static operation, and in both cases causes the phenomenon of so called empty or inactive piston stroke, and increase in the pressure in the pressure chamber is delayed to a unduly great extent from the position and the time that the brake or clutch pedal of the vehicle is initially depressed, and furthermore comes on relatively suddenly when it does arrive. Thus, the operational feeling for the brake or clutch pedal is worsened in the case of such a portless type master cylinder device, as compared with a conventional type of master cylinder device, and a good brake or clutch response cannot be obtained.

Figure 7:
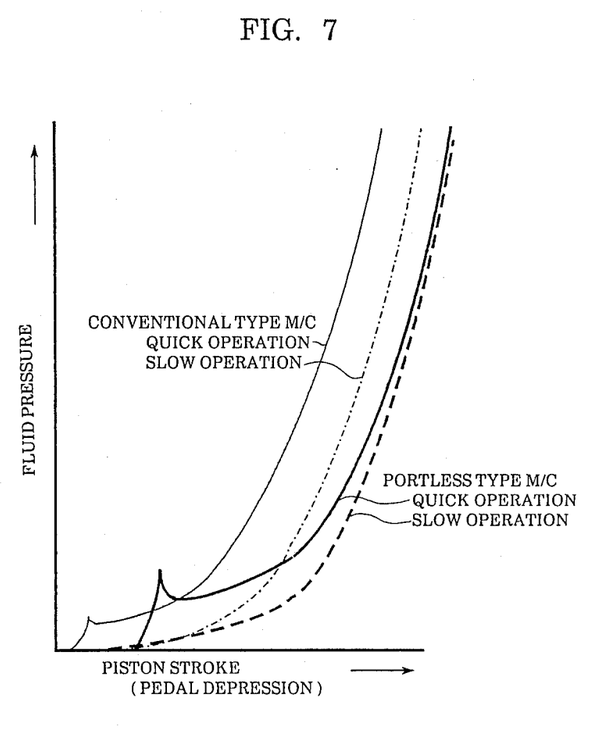
FIG. 7 is a set of four graphs showing piston member stroke against the fluid pressure produced thereby, illustrating the characteristics both of a conventional type master cylinder device and also of this portless type master cylinder device, both in the case of relatively quick brake pedal depression and in the case of relatively slow brake pedal depression.

This phenomenon is illustrated by the graphs shown in FIG. 7. In this figure there are shown a pair of graphs of piston stroke against brake fluid pressure, illustrating the characteristics of such a portless type master cylinder device, and of a conventional type of master cylinder device which is not a portless one: in each case, one said line shows the characteristics in the case of relatively quick brake pedal depression, while the other said line shows the characteristics in the case of relatively slow brake pedal depression. In other words, the one line shows the characteristics under dynamic conditions when the movement of the piston member is carried out relatively rapidly, while the other line shows the characteristics under static conditions when the movement of the piston member is carried out relatively slowly at a time scale large compared with any other time scales of the system. As will be clear from these graphs, for a portless type master cylinder device as described above, in the case of relatively rapid brake pedal operation, the initial portion of the movement of the brake or clutch pedal presents a sudden surge in fluid pressure and therefore in pedal resistance, and accordingly has a deteriorated operational feeling as compared with a conventional type of master cylinder device.

SUMMARY OF THE INVENTION

The inventors of the present invention have considered the various problems detailed above in the case of a portless type master cylinder, with the end in view of preserving the good characteristics of said portless type of master cylinder while overcoming the drawbacks thereof.

Accordingly, it is the primary object of the present invention to provide a portless type master cylinder device, which avoids the problems detailed above.

It is a further object of the present invention to provide such a portless type master cylinder device, which has a better operational feeling.

It is a further object of the present invention to provide such a portless type master cylinder device, the inactive or empty stroke initial portion of the piston member of which is much reduced.

It is a yet further object of the present invention to provide such a portless type master cylinder device, which provides an operational feeling comparable to that of a conventional type master cylinder device which is not of the portless type.

It is a yet further object of the present invention to provide such a portless type master cylinder device, which has different operational characteristics when it is operated quickly from its operational characteristics when it is operated slowly.

It is a yet further object of the present invention to provide such a portless type master cylinder device, in which a difference is present between the dynamic stroke and the static stroke of its piston member.

It is a yet further object of the present invention to provide such a portless type master cylinder device, in which the pressure in a pressure chamber thereof, as its piston member is progressively moved, increases steadily and at a steadily varying rate.

It is a yet further object of the present invention to provide such a portless type master cylinder device, which provides good and smooth response.

It is a yet further object of the present invention to provide such a portless type master cylinder device, which does not unduly delay increase in the pressure in the pressure chamber thereof from the position and the time that a brake or clutch pedal drivingly connected to said master cylinder device is initially depressed.

According to the most general aspect of the present invention, these and other objects are attained by a portless type master cylinder device, comprising: (a) a body within which is formed a cylinder bore; (b) a piston member which is fitted in said cylinder bore and is slidably movable from an initial axial position therein and which defines in cooperation with said cylinder bore a pressure chamber on its one side and a reservoir connection chamber on its other side; and: (c) a means, provided to said piston member, for allowing fluid flow through said piston member from said reservoir connection chamber to said pressure chamber but not substantially in the reverse direction, comprising: (c1) an intake valve which communicates between said cylinder chamber and said reservoir chamber, and which is opened when said piston member is in its said initial axial position while it is closed when said piston member moves through more than a determinate relatively small axial distance from its said initial axial position; and: (c2) intermediately along the fluid flow path between said intake valve and said reservoir chamber, a means for presenting a relatively high flow resistance to flow of fluid in the direction from said intake valve to said reservoir chamber.

According to such a portless type master cylinder device as specified above, since, even although the intake valve requires a certain degree of stroke (said determinate relatively small axial distance) before it is fully closed, and therefore said intake valve will not be closed until the piston member has moved through said determinate relatively small axial distance, nevertheless during this initial piston member movement the flow of fluid from the pressure chamber through the still open intake valve to the reservoir chamber is largely restricted by the means for presenting a relatively high flow resistance to flow of fluid in the direction from said intake valve to said reservoir chamber, and hence even while the piston member is thus executing its initial movement and before the intake valve is closed a satisfactorily increasing pressure will be put upon the fluid in the pressure chamber. Accordingly, the ineffective or empty stroke of the piston member is minimized, response of the master cylinder device is improved, and the operational feeling provided thereby is ameliorated.

Further, because as described above during the initial movement of the piston member, until the intake valve is completely closed, because the flow of fluid from the pressure chamber through the intake valve and through the means for allowing flow of fluid from said intake valve to said reservoir chamber is allowed although very much restricted, thereby even in this portless type master cylinder device, in the same way as in a conventional type master cylinder device which is not of the portless type, a certain difference (but not an excessive difference) is present between the dynamic stroke and the static stroke of the piston member; in other words its operational characteristics when it is operated quickly are somewhat but not excessively different from its operational characteristics when it is operated slowly. Accordingly, at the instant that the intake valve becomes closed, a sudden rise in the pressure chamber, or rather a discontinuity in its rate of rise, is avoided, and smoother operation of this master cylinder device is thus available, as compared to other portless type master cylinder devices. Thus this portless type master cylinder device provides an operational feeling comparable to that of a conventional type master cylinder device which is not of the portless type.

And, yet further, when the brake or clutch pedal is released, the piston member moves back toward its original position, and at this point the return flow of fluid from the outlet port leading to the vehicle braking or clutching system back into said pressure chamber is delayed by fluid path resistance and so forth, and a temporary partial vacuum state may be set up in said pressure chamber. At this time the fluid in the reservoir chamber flows through the means provided to said piston member for allowing fluid flow through said piston member from said reservoir chamber to said pressure chamber but not substantially in the reverse direction, for example by pressing open the intake valve, and flows towards said pressure chamber, and the above flow of fluid is not substantially obstructed, and thereby no large vacuum is formed in said pressure increasing chamber.

Further, according to a particular specialization of the present invention, the above specified and other objects may be more particularly attained by a portless type master cylinder device as specified above, wherein said intake valve comprises a valve seat formed with a valve aperture, a valve element which cooperates with said valve seat to open or close said valve aperture, a means for biasing said valve element towards said valve seat so as to close said valve aperture; and a means for, when said piston member is in its said initial axial position, impelling said valve element away from said valve seat so as to open said valve aperture. On the other hand, as an alternative, the above specified and other objects may be more particularly attained by a portless type master cylinder device as specified above, wherein said means for presenting a relatively high flow resistance to flow of fluid in the direction from said intake valve to said reservoir chamber is a relatively narrow passage.

Further, according to yet another particular specialization of the present invention, the above specified and other objects are more particularly attained by a portless type master cylinder device of the type last specified in the paragraph above, wherein said relatively narrow passage is formed as an aperture through said body of said piston. On the other hand, according to yet another particular specialization of the present invention, the above specified and other objects are more particularly attained by a portless type master cylinder device of the type first specified in the paragraph above, wherein said means for presenting a relatively high flow resistance to flow of fluid in the direction from said intake valve to said reservoir chamber is a relatively narrow passage; and in this case said means for, when said piston member is in its initial axial position, impelling said valve element away from said valve seat so as to open said valve aperture may be a piston sliding in a bore, and said relatively narrow passage may then be formed as a groove in the side of said piston. Alternatively, said means for, when said piston member is in its initial axial position, impelling said valve element away from said valve seat so as to open said valve aperture may be a push rod which moves in a push rod hole, and said relatively narrow passage may then be formed as a gap between a taper portion of said push rod and a taper portion of said push rod hole. Or, again, said means for, when said piston member is in its said initial axial position, impelling said valve element away from said valve seat so as to open said valve aperture may be a hollow tube with an axial hole through its center which slides in a rod receiving hole, and said relatively narrow passage may be formed as a constricted portion in said axial hole of said hollow tube. In this case, or alternatively, a means may be fitted in said axial hole through said hollow tube for allowing the flow therethrough of fluid in the direction from said reservoir chamber to said intake valve but not substantially in the reverse direction, and said relatively narrow passage may be formed as a gap between the exterior surface of said hollow tube and the interior surface of said rod receiving hole, or alternatively or additionally may be constituted by a certain leakage available past said means fitted in said axial hole. In this last case, when the piston performs its return stroke and moves back towards its original position, and the return flow of fluid from the outlet port leading to the vehicle braking or clutching system back into said pressure chamber may be delayed by fluid path resistance and so forth, the possible temporary partial vacuum state which might be set up in the pressure chamber is even more positively canceled by the fluid in the reservoir chamber flowing through this means provided in said axial hole for allowing fluid flow therethrough from said reservoir chamber to said pressure chamber but not substantially in the reverse direction, and since the above flow of fluid is not substantially obstructed it is virtually guaranteed that thereby no large vacuum is formed in said pressure increasing chamber.

BRIEF DESCRIPTION OF THE DRAWINGS

The present invention will now be described with respect to the preferred embodiments thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures relating to one preferred embodiment, and like parts and gaps and spaces and so on in the figures relating to different preferred embodiments; and:

DESCRIPTION OF THE PREFERRED EMBODIMENTS

The present invention will now be described with reference to the preferred embodiments thereof, and with reference to the figures.

THE FIRST PREFERRED EMBODIMENT

Figure 1:
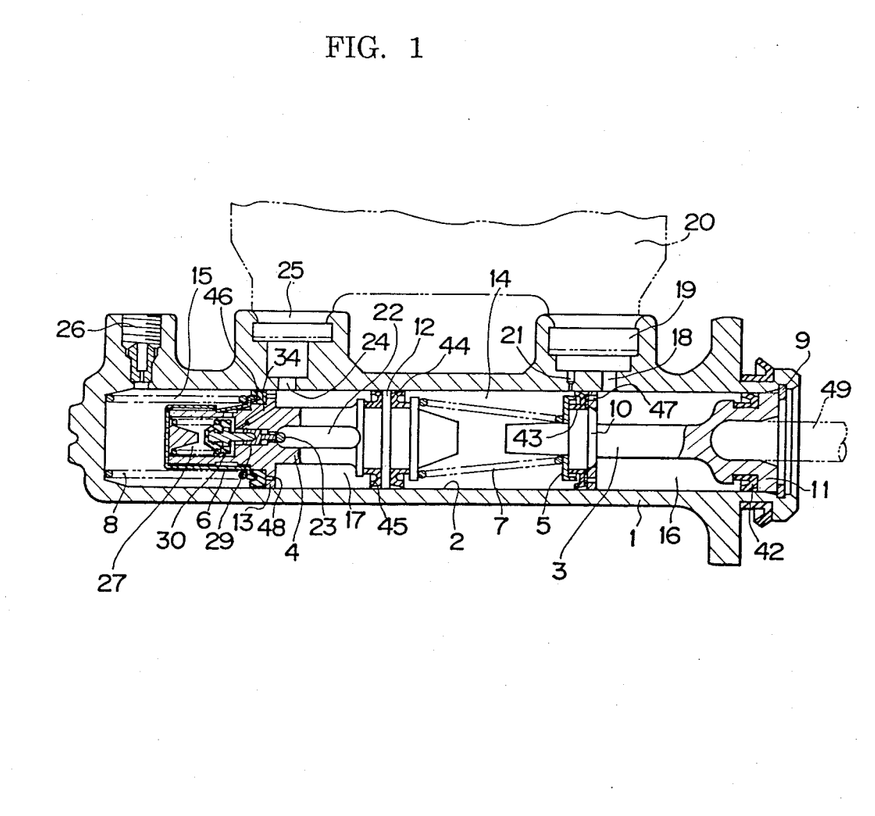
FIG. 1 is a longitudinal sectional view of the first preferred embodiment of the portless type master cylinder device of the present invention, which is a tandem type master cylinder for use with a dual type braking system of a vehicle.
Figure 2:
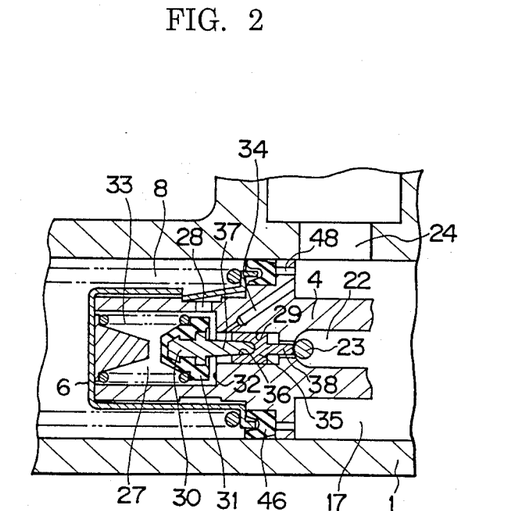
FIG. 2 is an enlarged longitudinal sectional view of an end portion of a second piston member of said first preferred embodiment portless type master cylinder device and of a valve construction incorporated therein.

FIGS. 1 and 2 show the first preferred embodiment of the portless type master cylinder device of the present invention; and, particularly, FIG. 1 is a longitudinal sectional view of said first preferred embodiment, which is a tandem type master cylinder for use with a dual type braking system of a vehicle. In this figure, the reference numeral 1 designates the body of said master cylinder device, and said master cylinder body 1 is formed with a cylinder bore 2, having a closed end and an open end, and within which there are provided a first piston member 3 and a second piston member 4 both slidably mounted in said cylinder bore 2 so as to be movable to and fro along the axial direction thereof. The first piston member 3 is the one fitted less deeply in cylinder bore 2 and on the side in the figure towards its open end, while the second piston member 4 is the one fitted more deeply in said cylinder bore 2 and on the side in the figure towards its closed end.

The first piston member 3 is formed with two lands 10 and 11 on which it slides in said cylinder bore 2, and on the inner end of said first piston member 3 there is mounted a retainer or cap 5. Between this retainer 5 and the outer end of the second piston member 4 there is fitted a compression coil spring 7 which thus biases apart said first piston member 3 and said second piston member 4, i.e. which biases said first piston member 3 rightwards in the cylinder bore 2 from the point of view of FIG. 1, outwards from the cylinder bore 2, while simultaneously biasing said second piston member 4 leftwards in said cylinder bore 2 from the point of view of said figure, inwards into said cylinder bore 2. And the second piston member 4 is formed with two lands 12 and 13 on which it slides in said cylinder bore 2, and on the inner end of said second piston member 4 there is mounted another retainer or cap 6. Between this retainer 6 and the closed inner end of the cylinder bore 2 there is fitted another compression coil spring 8 which thus biases said second piston member 4 leftwards in the cylinder bore 2 from the point of view of FIG. 1, outwards from the cylinder bore 2. And a depression is formed in the left end in the figure of the first piston member 3, into which is fitted the end of a push rod 49, the other end of which is connected to a brake pedal of a vehicle for being depressed by the foot of a driver of said vehicle, although these arrangements are not particularly shown. Thus, when said accelerator pedal is depressed by the foot of the driver, and thereby said push rod 49 forces the first piston member 3 leftwards in the figure in the cylinder bore 3, the second piston member 4 becomes thereby positioned at an intermediate point in the cylinder bore 2 according to a balance which is struck between the opposing spring forces of the compression coil springs 7 and 8 and the pressures in various chambers defined in said cylinder bore which will be explained shortly. A stopper ring 9 provided at the open end of the cylinder bore 2 prevents the first piston member 3 from coming out of said open end.

Referring to the orientation of the parts shown in FIG. 1, in the cylinder bore 2 between the left land 10 of the first piston member 3 and the right land 12 of the second piston member 4 there is defined a first pressure chamber 14, and in said cylinder bore 2 between the left land 13 of the second piston member 4 and the closed end of the cylinder bore 2 there is defined a second pressure chamber 15. And in said cylinder bore 2 between the right land 9 and the left land 10 of said first piston member 3 there is defined a first reservoir connection chamber 16, and in said cylinder bore 2 between the right land 13 and the left land 13 of the second piston member 4 there is defined a second reservoir connection chamber 17.

A fluid reservoir port 18 is formed in the side of said cylinder bore 2 in such a position that, whatever be the axial position of the first piston member 3 in the cylinder bore 2, the first reservoir connection chamber 16 is communicated to said fluid reservoir port 18 and therethrough with a reservoir connection port 19 which leads to a brake fluid reservoir 20 only schematically shown. At a position in said cylinder bore 2 somewhat to the left in the figure of said fluid reservoir port 18 there is also formed a somewhat restricted orifice port 21, which communicates the first pressure chamber 14 to said reservoir connection port 19 and therethrough to said brake fluid reservoir 20, when and only when the first piston member 3 is in its extreme position to the right from the point of view of FIG. 1 in the cylinder bore 2, as shown in that figure; but, when said first piston member 3 is displaced from its said extreme position to the right in the cylinder bore 2 to any substantial extent to the left, then communication of said first pressure chamber 14 to said reservoir connection port 19 and therethrough to said brake fluid reservoir 20 is interrupted by the intervention of the land 10 of said piston member 3. Further in the body 1 of this master cylinder device there is formed a brake fluid outlet passage opening to the first pressure chamber 14 for receiving brake fluid compressed therein and for transmitting said compressed brake fluid to one braking system of the vehicle to which this master cylinder device is fitted; but this brake fluid outlet passage is not shown in the figures.

The second piston member 4 is formed with a slot 22 extending along its axial direction, and a stopper pin 23 is fixed to the body 1 of this master cylinder device and protrudes into the cylinder bore 2 so as to pass through and be engaged into this slot 22. Thus the travel to the right as seen in FIG. 1 of the second piston member 4 under the influence of the spring force of the compression coil spring 8 is limited to the position thereof shown in FIG. 1 by the pin 23 coming into contact with the left end in FIG. 1 of the slot 22. A fluid reservoir port 24 is formed in the side of the cylinder bore 2 in such a position that, whatever be the axial position of the second piston member 4 in the cylinder bore 2, the second reservoir connection chamber 17 is communicated to said fluid reservoir port 24 and further therethrough is communicated with a reservoir connection port 25 which leads to the brake fluid reservoir 20. Further in the body 1 of this master cylinder device there is formed a brake fluid outlet passage 26 opening to the second pressure chamber 15 for receiving brake fluid compressed therein and transmitting said compressed brake fluid to the other braking system of the vehicle to which this master cylinder device is fitted.

Referring particularly now to the enlarged longitudinal sectional view of the left end portion of the second piston member 4 shown in FIG. 2, in said left end portion of said second piston member 4 there is formed a cylindrical intake valve chamber 27, the end of which is closed off by the retainer 6, and which on the one hand is communicated via holes 28 formed in the side of said left end portion of said second piston member 4 to the second pressure chamber 15, and on the other hand is communicated to a piston chamber 29 formed as longitudinally extending through said left end portion of said second piston member 4 to the left end in the figure of the slot 22. A valve element 30 is mounted in the intake valve chamber 27, and is fitted with a resilient sealing element 31 formed of rubber or a like synthetic elastomer. This valve body 30 is biased to the right in the figure against a valve seat 32 defined on the left end of said second piston member 4 by a compression coil spring 33 fitted between said valve body 30 and said retainer 6, so as to close the valve seat 32.

And, leading from a leftward portion of the piston chamber 29 to the second reservoir connection chamber 27, there is formed through the second piston member 4 a slanting throttle passage 34, which is constructed to be restricted in its diameter and thus to oppose a very considerable resistance to the flow of fluid through it.

A small piston 35 is provided as slidably fitted in the piston chamber 29 and intercepts it so that fluid cannot flow through said piston chamber 29 from the intake valve chamber 27 to the slot 22 and thence into the second reservoir connection chamber 27. A projecting rod portion 37 of the valve element 30 is seated in a depression 36 formed in the end of said small piston 35 opposing said valve element 30, and the other end of said small piston 35 is formed as a push rod 38 which opposes and confronts the retainer pin 23. Thereby, when the second piston member 4 is in its extreme position to the right as seen in FIG. 2 in the cylinder bore 2, with the pin 23 abutting against the left end of the slot 22, then the right end of this push rod 38 presses against the pin 23, and this pushes the push rod 38 and the small piston 35 formed integrally therewith slightly to the left with respect to the second piston member 4, so as to lift the valve element 30 off from the valve seat 32 and so as to establish restricted communication between the second pressure chamber 15 and the second reservoir connection chamber 17, via the throttle passage 34 with a very substantial flow resistance being opposed to flow between them; but, on the other hand, when the second piston member 4 is in any other position even relatively slightly displaced to the left in said cylinder bore 2, with the pin 23 thus not abutting against the left end of the slot 22, then the right end of this push rod 38 no longer presses against the pin 23, and thus the push rod 38 and the small piston 35 formed integrally therewith are no longer pressed at all to the left with respect to the second piston member 4, so that the valve element 30 is left free to be biased by the compression coil spring 33 against the valve seat 32, so as to completely and definitely interrupt communication between the second pressure chamber 15 and the second reservoir connection chamber 17.

The right land 11 in FIG. 1 of the first piston member 3 is fitted with an annular seal element 42 made of an elastomer such as rubber, which seals between the first reservoir connection chamber 16 and the outside. And the left land 10 in FIG. 1 of said first piston member 3 is fitted with another annular seal element 43 also made of an elastomer such as rubber, which seals between the first reservoir connection chamber 16 and the first pressure chamber 14. Through said left land 10 of said first piston member 3 there are formed a plurality of small orifices 47, which allow brake fluid to flow from the first reservoir connection chamber 16 past the seal element 43 which provides a non return action into the first pressure chamber 14, but not in the reverse direction. The right land 12 in FIG. 1 of the second piston member 4 is fitted on its right side with another annular seal element 44 and on its left side with yet another annular seal element 45, both said seal elements 44 and 45 also being made of an elastomer such as rubber and thus together providing an effective two way seal between the second reservoir connection chamber 17 and the first pressure chamber 14. And the left land 13 in FIG. 1 of the second piston member 4 is fitted on its left side with yet another annular seal element 46, said seal element 46 also being made of an elastomer such as rubber and providing a seal between the second pressure chamber 15 and the second reservoir connection chamber 17. Through said left land 13 of said second piston member 4 there are formed a plurality of small orifices 48, which allow brake fluid to flow from the second reservoir connection chamber 17 past the seal element 46 which provides a non return action into the second pressure chamber 15, but not in the reverse direction.

This preferred embodiment of the portless type master cylinder device of the present invention operates as will be explained in the following.

When the brake pedal of the vehicle to which this master cylinder device is fitted is in the released condition and the device is in the substantially static state, then the push rod 49 does not press substantially upon the first piston member 3, and said first piston member 3 and the second piston member 4 are positioned by the biasing action of the compression coil springs 7 and 8 to their maximum positions to the right in FIG. 1 in the cylinder bore 2, as shown in FIG. 1. In this operational condition, the first pressure chamber 14 is communicated via the orifice port 21 to the reservoir connection port 19 and therethrough to the brake fluid reservoir 20. Also, as shown in FIG. 2, the pin 23 is pressing against the end of the push rod 38 fitted to the piston 35 and is thereby holding the valve element 30 away from its valve seat 32 against the biasing force of the compression coil spring 33 which is overcome, thus allowing the second pressure chamber 15 to be communicated with the brake fluid reservoir 20 via the holes 28, the valve seat 32, the throttle passage 34, the second reservoir connection chamber 17, the fluid reservoir port 24, and the reservoir connection port 25. Thus, brake fluid from the brake fluid reservoir 20 is freely supplied to the first pressure chamber 14 in this static state with the vehicle brake pedal being released, and thence to the second pressure chamber 15 albeit with a substantial flow resistance.

When from this state the brake pedal is initially pressed downwards, this causes the push rod 49 to push the first piston member 3 and to move it slightly to the left as seen in FIG. 1 from its position in that figure against the biasing force of the compression coil spring 7, and under the balance struck between the opposing biasing forces of the compression coil springs 7 and 8 the second piston member 4 likewise moves slightly to the left as seen in FIG. 1 from its position in that figure.

According to this movement, as soon as the seal element 43 passes past the orifice port 21 opening in the side of the cylinder bore 2, communication between the first pressure chamber 14 and the brake fluid reservoir 20 is interrupted, and along with further movement of the first piston member 3 the pressure in the first pressure chamber 14 rises thereafter.

Also, simultaneously with this, as the second piston member 4 is thus moved to the left as seen in FIG. 1, as soon as the pin 23 has released the end of the push rod 38 said push rod 38 and the small piston 35 and the valve element 30 are allowed to be moved by the biasing action of the compression coil spring 33 slightly to the right as seen in FIG. 2 from their positions as shown in that figure, and by this action the valve seat 32 is closed by the seal element 31, thereby substantially completely interrupting communication from the second pressure chamber 15 to the second reservoir connection chamber 17 and thus to the brake fluid reservoir 20. And thereafter along with further movement of the first piston member 3 the pressure in the first pressure chamber 4 rises. However, even before this initial motion of the second piston member 4 has fully taken place, as soon as the brake fluid in the second pressure chamber 15 is pressurized even relatively slightly and long before the pin 23 has released the end of the push rod 35 and said push rod 35 and the valve element 30 are thus moved to close the valve seat 32, some of said brake fluid in said second pressure chamber 15 is driven through the throttle passage 34 into the second reservoir connection chamber 17 and thence through the fluid reservoir port 24 and via the reservoir connection port 25 to the brake fluid reservoir 20. At this time, however, because the throttle passage 34 has a relatively high resistance to fluid flow, only a relatively small such brake fluid flow is allowed to take place. Thereby, at this time, the flow of brake fluid from the second pressure chamber 15 to the brake fluid reservoir 20 is restricted to a relatively small amount, that is to say is throttled, and, although the valve constituted by a valve seat member 32 and the valve element 30 is still open at this relatively early stage of brake pedal depression, nevertheless the pressure in the second pressure chamber 15 rises steadily and satisfactorily. By this operation, the ineffective portion of the stroke of the second piston member 4 is reduced, as compared with the prior art described in the earlier portion of this specification, and a difference is established between the static stroke characteristic of the piston and its dynamic stroke characteristic. I.e., in the case of relatively rapid brake pedal operation, which of course is the typical case, the initial portion of the movement of the brake pedal which in the prior art and in the case of very slow pedal movement constituted an ineffective pedal stroke portion, is reduced or eliminated.

At the point that the valve element 30 of the valve construction in the second piston member 4 meets the valve seat member 32 and thus closes said valve construction, since the flow of brake fluid from the second pressure chamber 15 through the second reservoir connection chamber 17 to the brake fluid reservoir 20 in the case of relatively brisk brake pedal operation is already virtually prohibited (on the time scale appropriate to this type of brake pedal application), thereby a difference arises between the dynamic stroke of the second piston member 4 and its static stroke as explained above, and also at this instant that said valve element 30 meets said valve seat member 32 a very sudden rise in the brake fluid pressure in the second pressure chamber 15 is prevented (or rather a discontinuity in the slope of the rise of said pressure is prevented), and thereby a superior type of pedal operational feeling comparable to that of a conventional type of master cylinder device of conventional construction (i.e. better than that of the typical portless type of master cylinder device) is obtained.

Thereafter, as the driver presses further on the brake pedal, the first piston member 3 and the second piston member 4 are further driven to the left as seen in FIG. 1 as is per se conventional, expelling brake fluid from the first pressure chamber 14 and the second pressure chamber 15 to the two braking systems of the vehicle and applying the brakes thereof.

When the brake pedal is later released by the foot of the vehicle driver, the first piston member 3 and the second piston member 4 are allowed, under the biasing actions of the compression coil springs 7 and 8, to move back again in the rightwards direction from the point of FIG. 1 towards their positions as shown in that figure. At this time, the return flow of fluid from the outlet port 26 back into the second pressure chamber 15 is restrained and delayed by fluid resistance and so forth in the braking system (not particularly shown) connected to said outlet port 26, and hence a temporary partial vacuum state (depression below atmospheric pressure) is set up in said second pressure chamber 15, and this partial vacuum state sucks brake fluid from the brake fluid reservoir 20 through the reservoir connection port 25 and through the fluid reservoir port 24 into the second reservoir connection chamber 17, and thence to a slight extent through the throttle passage 34 but mostly through the orifices 48 past the seal element 46, pressing open the valve element 30 and the seal element 46 respectively, into the second pressure chamber 15, so as to thus relieve said temporary partial vacuum state in said second pressure chamber 15. Thereby, the occurrence of a relatively high partial vacuum state in said second pressure chamber 15 is prevented.

Now, this fluid which had thus flowed from the brake fluid reservoir 20 into the second pressure chamber 15 at the initial part of the return stroke of the piston members 3 and 4 as described above, when the second piston member 4 has returned to close to its initial position as shown in FIG. 1 and the valve 30 is displaced from its valve seat 32 by the action of the pin 23 pushing on the end of the rod 35, returns through the throttle passage 34 to the second reservoir connection chamber 17 and via the fluid reservoir port 24 and the reservoir connection port 25 to the brake fluid reservoir 20. Although this flow is inevitably rather slow due to the restricted nature of the throttle passage 34, nevertheless, since this surplus brake fluid can gradually ooze and seep through the throttle passage 34 to the brake fluid reservoir 20, the persistence of a remainder pressure in the second pressure chamber 15 after the driver of the vehicle releases the brake pedal thereof is positively prevented.

THE SECOND PREFERRED EMBODIMENT

Figure 3:
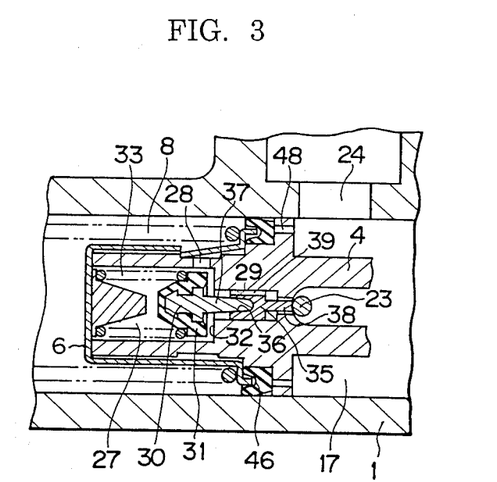
FIG. 3 is an enlarged longitudinal sectional view, similar to FIG. 2 for the first preferred embodiment, and particularly showing a valve construction incorporated in the second preferred embodiment of the portless type master cylinder device of the present invention.

The valve device incorporated in the second piston member 4 of the second preferred embodiment of the portless type master cylinder device of the present invention as shown in FIG. 3, in a similar manner to FIG. 2 relating to the first preferred embodiment. In this figure, parts and gaps and spaces and so on of this second preferred embodiment which correspond to analogous parts and gaps and spaces and so on of the first preferred embodiment are denoted by reference numerals like to those utilized in FIGS. 1 and 2 relating to said first preferred embodiment.

In this second preferred embodiment the throttle passage 34 is not formed as a passage through the material of the second piston member 4 as was the case in the first preferred embodiment disclosed above, but instead is a groove formed along the side of the small piston member 35. A spiral groove or orifice would be also suitable. The same effects and benefits are obtained in this second preferred embodiment of the portless type master cylinder device of the present invention, as were obtained in the case of the first preferred embodiment described earlier.

THE THIRD PREFERRED EMBODIMENT

Figure 4:
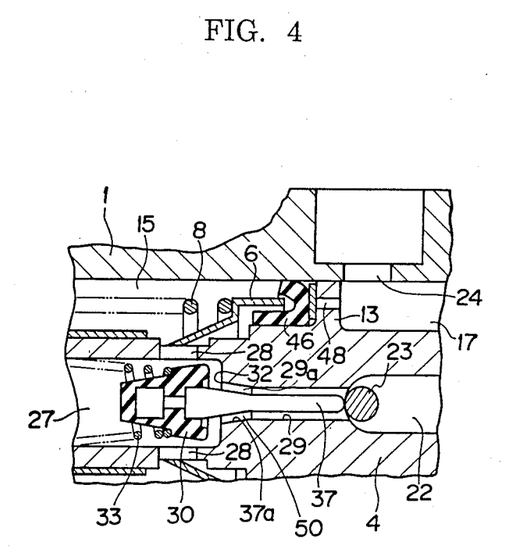
FIG. 4 is an enlarged longitudinal sectional view, similar to FIGS. 3 and 4 for the first and the second preferred embodiments respectively, showing a valve construction incorporated in the third preferred embodiment of the portless type master cylinder device of the present invention.

The valve device incorporated in the second piston member 4 of the third preferred embodiment of the portless type master cylinder device of the present invention is shown in FIG. 4, in a similar manner to FIG. 2 relating to the first preferred embodiment and to FIG. 3 relating to the second preferred embodiment. Again, in this figure, parts and gaps and spaces and so on of this third preferred embodiment which correspond to analogous parts and gaps and spaces and so on of the first and second preferred embodiments are denoted by reference numerals like to those utilized in the figures relating to said first and second preferred embodiments.

In this third preferred embodiment the restricted throttle passage 34 from the valve chamber 27 to the second reservoir connection chamber 17 is no longer formed as an aperture through the material of the second piston member 4, but rather is provided as a gap 50 defined by the cooperation of a taper portion 37a formed on the base portion of the projecting rod portion 37 of the valve element 30 and a corresponding taper portion 29a formed at the corresponding end of the piston chamber aperture 29. And, in this third preferred embodiment of the present invention, the end of the projecting rod portion 37 itself presses against the pin 23 with no intermediate member being provided therebetween. The same effects and benefits are obtained in this third preferred embodiment of the portless type master cylinder device of the present invention, as were obtained in the case of the first and second preferred embodiments described earlier.

THE FOURTH PREFERRED EMBODIMENT

Figure 5:
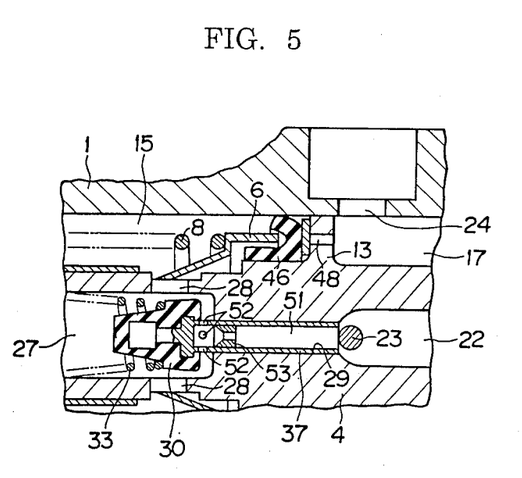
FIG. 5 is an enlarged longitudinal sectional view, similar to FIGS. 2 through 4 for the first through the third preferred embodiments respectively, showing a valve construction incorporated in the fourth preferred embodiment of the portless type master cylinder device of the present invention.

The construction utilized in the fourth preferred embodiment of the portless type master cylinder device of the present invention is shown in FIG. 5, in a similar manner to FIGS. 2 through 4 relating to the first through the third preferred embodiments. Again, in this figure, parts and gaps and spaces and so on of this fourth preferred embodiment which correspond to analogous parts and gaps and spaces and so on of the first through the third preferred embodiments are denoted by reference numerals like to those utilized in the figures relating to said first through third preferred embodiments.

In this fourth preferred embodiment the connecting rod portion 37 is formed as a hollow tube member with a hole extending along its central axis, sliding within the piston chamber 29. The intake valve chamber 27 and the second reservoir connection chamber 17 are communicated via the hollow central space of this connecting rod portion 37, which is communicated with said intake valve chamber 27 via holes 52 formed through the sides of said connecting rod portion 37 at its left end portion in the figure. A throttling member 53 is fitted at an intermediate point along said central axial hole of said connecting rod portion 37. The same effects and benefits are obtained in this fourth preferred embodiment of the portless type master cylinder device of the present invention, as were obtained in the case of the first through the third preferred embodiments described earlier.

THE FIFTH PREFERRED EMBODIMENT

Figure 6:
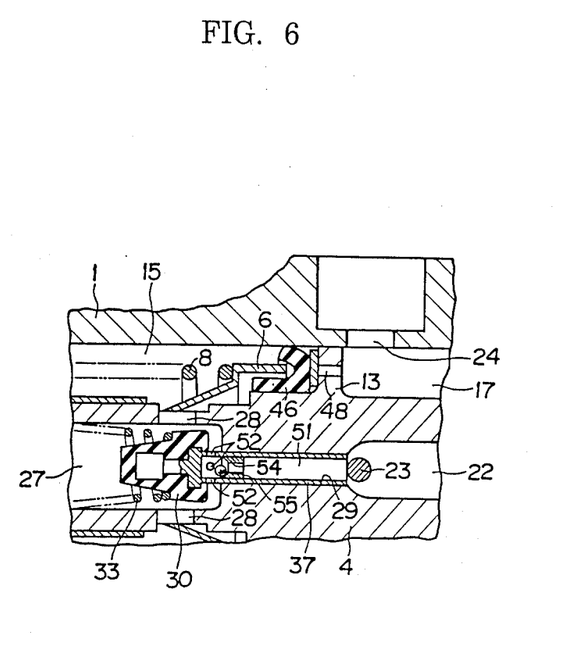
FIG. 6 is a longitudinal sectional view, similar to FIGS. 2 through 5 for the first through the fourth preferred embodiments respectively, showing a valve construction incorporated in the fifth preferred embodiment of the portless type master cylinder device of the present invention.

The fifth preferred embodiment of the portless type master cylinder device of the present invention is shown in FIG. 6, in a similar manner to FIGS. 2 through 5 relating to the first through the fourth preferred embodiments. Again, in this figure, parts and gaps and spaces and so on of this fifth preferred embodiment which correspond to analogous parts and gaps and spaces and so on of the first through the fourth preferred embodiments are denoted by reference numerals like to those utilized in the figures relating to said first through fourth preferred embodiments.

In this fifth preferred embodiment the connecting rod portion 37 is again formed as a hollow tube member with a hole 51 extending along its central axis, and is slidably mounted within the piston chamber 29, this time with a minute but still considerable space being present around its outside cylindrical surface between said outside cylindrical surface and the inner cylindrical surface of said piston chamber 29. The intake valve chamber 27 and the second reservoir connection chamber 17 are again communicated via the hollow central space 51 of this connecting rod portion 37, which is communicated with said intake valve chamber 27 via holes 52 formed through the sides of said connecting rod portion 37 at its left end portion in the figure; but a valve seat member 54 is fitted at an intermediate point along said central axial hole of said connecting rod portion 37, and a check ball 55 is provided within said central axial hole on the side towards the intake valve chamber 27. This check ball 55 cooperates with the valve seat member 54 to restrict the flow of fluid from the intake valve chamber 27 through the hollow central space 51 of the connecting rod portion 37 to the second reservoir connection chamber 17, but not to stifle said fluid flow completely, due to some leakage past said check ball 55 through said valve seat member 54. Also, some flow from said intake valve chamber 27 through the hollow central space of the connecting rod portion 37 to the second reservoir connection chamber 17 is possible through the aforementioned space present between said outside cylindrical surface of the connecting rod portion 37 and the inner cylindrical surface of the piston chamber 29. On the other hand, said check ball 55 cooperates with the valve seat member 54 to allow substantially free flow of fluid in the reverse direction from the second reservoir connection chamber 17 through the hollow central space 51 of the connecting rod portion 37 to the intake valve chamber 27, thus functioning effectively as a one way valve.

Thus, when the brake pedal of the vehicle (not particularly shown) is depressed and the first piston member 3 and the second piston member 4 move to the left from the point of view of the figures, pressurizing brake fluid in the second pressure chamber 15, the check ball 55 is seated by this pressure against the valve seat member 54, thus restricting to a very high flow resistance the connection between the second pressure chamber 15 and the second reservoir connection chamber 17; and thus, until the intake valve construction subsequently closes, the flow of brake fluid from the second pressure chamber 15 to the second reservoir chamber 17 is very greatly restricted, thus providing the same effects and benefits in this fifth preferred embodiment of the portless type master cylinder device of the present invention as were obtained in the case of the first through the fourth preferred embodiments described earlier.

Furthermore, in this fifth preferred embodiment, the further advantage is made available that, on the return stroke of the piston members 3 and 4, when a partial vacuum is generated in the second pressure chamber 15, the check ball 55 moves away from the valve seat 54, whereby the brake fluid in the second reservoir connection chamber 17, as well as flowing through the holes 48, is allowed to flow relatively freely through the hole 51 extending along the central axis of the connecting rod portion 37, and thus at this time point a high partial vacuum is even more positively and definitely prevented from being set up in the second pressure chamber 15.

Although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. A portless type master cylinder device for optionally transferring a hyrdraulic fluid between a reservoir for said hydraulic fluid and a hydraulic actuator, comprising:

a piston body formed with a cylinder bore;

a piston member slidably fitted in said cylinder bore so as to define a pressure chamber on a first axial side thereof and a reservoir connection chamber on a second axial side thereof opposite to said first axial side and to be axially movable away from a determinate initial axial position thereof in a first direction oriented from said reservoir connection chamber toward said pressure chamber and back to said initial axial position in a second direction opposite to said first direction, said reservoir connection chamber being constantly in free communication with said reservoir;

a stop means for restraining said piston member from moving beyond said initial axial position in said second direction; and an intake valve incorporated in said piston member and adapted to be actuated by said stop means when and only when said piston member is within a close vicinity of said initial axial position so as to open a substantially throttled passage communicating said pressure chamber with said reservoir connection chamber, said passage being so throttled as to dynamically hold a normal actuating pressure for said hydraulic actuator in said pressure chamber.

2. A portless type master cylinder device according to claim 1, wherein said intake valve comprises a valve seat formed with a valve aperture, a valve element which cooperates with said valve seat to open or close said valve aperture, a means for biasing said valve element towards said valve seat so as to close said valve aperture; and a rod means for, when said piston member is in its said initial axial position, engaging said stop means and impelling said valve element away from said valve seat so as to open said valve aperture.

3. A portless type master cylinder device according to claim 2, wherein said means for, when said piston member is in its said initial axial position, impelling said valve element away from said valve seat so as to open said valve aperture is a piston sliding in a bore, and said relatively narrow passage is formed as a groove in the side of said piston.

4. A portless type master cylinder device according to claim 2, wherein said means for, when said piston member is in its said initial axial position, impelling said valve element away from said valve seat so as to open said valve aperture is a push rod which moves in a push rod hole, and said relatively narrow passage is formed as a gap between a taper portion of said push rod and a taper portion of said push rod hole.

5. A portless type master cylinder device according to claim 2, wherein said means for, when said piston member is in its said initial axial position, impelling said valve element away from said valve seat so as to open said valve aperture is a hollow tube with an axial hole through its center which slides in a rod receiving hole, and said relatively narrow passage is formed as a constricted portion in said axial hole of said hollow tube.

6. A portless type master cylinder device according to claim 2, wherein said means for, when said piston member is in its said initial axial position, impelling said valve element away from said valve seat so as to open said valve aperture is a hollow tube with an axial hole through its center which slides in a rod receiving hole, further comprising a means fitted in said axial hole through said hollow tube for allowing the flow therethrough of fluid in the direction from said reservoir chamber to said intake valve but not substantially in the reverse direction, and wherein said relatively narrow passage is formed as a gap between the exterior surface of said hollow tube and the interior surface of said rod receiving hole.

7. A portless type master cylinder device according to claim 2, wherein said means for, when said piston member is in its said initial axial position, impelling said valve element away from said valve seat so as to open said valve aperture is a hollow tube with an axial hole thorugh its center which slides in a rod receiving hole, further comprising a means fitted in said axial hole through said hollow tube for allowing the flow therethrough of fluid in the direction from said reservoir chamber to said intake valve but severely restricting flow in the reverse direction by constricting said reverse flow to a relatively narrow gap which constitutes said relatively narrow passage.

8. A portless type master cylinder device according to claim 7, wherein additionally said relatively narrow passage is constituted by a gap between the exterior surface of said hollow tube and the interior surface of said rod receiving hole.

9. A portless type master cylinder device according to claim 1, wherein said substantially throttled passage is formed as an aperture through a body of said piston.

* * * * *